(12) United States Patent  (10) Patent No.: US 7,748,134 B1
Wang  (45) Date of Patent: Jul. 6, 2010

(54) MEASURING DEVICE FOR CYLINDER

(76) Inventor: Yao-Chung Wang, No. 49, Sioushan 5th Rd., Daya Township, Taichung County (TW) 428

( * ) Notice: Subject to any disclaimer, the term of this patent is extended or adjusted under 35 U.S.C. 154(b) by 0 days.

(21) Appl. No.: 12/399,989

(22) Filed: Mar. 9, 2009

(51) Int. Cl.
*G01B 5/20* (2006.01)
(52) U.S. Cl. .................................. 33/551; 33/555.1
(58) Field of Classification Search .................. 33/552, 33/555.1, 551, 553, 554, 555.3, 501.02
See application file for complete search history.

(56) References Cited

U.S. PATENT DOCUMENTS

| | | | |
|---|---|---|---|
| 4,914,827 A * | 4/1990 | Cook | 33/552 |
| 4,916,824 A * | 4/1990 | Shimazutsu et al. | 33/551 |
| 5,068,974 A * | 12/1991 | Possati et al. | 33/549 |
| 6,427,353 B1 * | 8/2002 | Nelson et al. | 33/552 |
| 6,754,973 B2 * | 6/2004 | Takahashi | 33/551 |
| 6,954,991 B2 * | 10/2005 | Akatsuka et al. | 33/550 |
| 7,228,640 B2 * | 6/2007 | Trionfetti, Gianni | 33/552 |
| 7,389,594 B2 * | 6/2008 | Takahashi | 33/554 |

* cited by examiner

*Primary Examiner*—Yaritza Guadalupe-McCall
(74) *Attorney, Agent, or Firm*—Pai Patent & Trademark Law Firm; Chao-Chang David Pai

(57) ABSTRACT

A measuring device includes a base, a holding member mounted to the base and having a notch for holding a cylinder, a guide rod connected to the base and defining an axial direction parallel to an axial direction of the cylinder, and a gauge mounted with the guide rod and defining a measuring direction perpendicular to the axial direction of the cylinder. As a result, the measuring device of the present invention has the advantage of proving a simple way to measure the roundness of the cylinder.

8 Claims, 5 Drawing Sheets

MEASURING DEVICE FOR CYLINDER

BACKGROUND OF THE INVENTION

1. Field of the Invention

The present invention relates generally to a measuring device, and more specifically to a measuring device that is used to measure the roundness or length of a cylinder.

2. Description of the Related Art

A conventional measuring device for a cylinder generally comprises two ejector rods for holding two opposite ends of the cylinder, and a gauge for measuring the roundness or length of the cylinder.

In order to obtain high accuracy in measurement, the ejector rods need to be aligned to an axis of the cylinder as far as possible, but it will take a lot of time to ensure the alignment between the ejector rods and the axis of the cylinder. Therefore, it can be seen that the conventional measuring device is too complicated to operate.

SUMMARY OF THE INVENTION

The present invention has been accomplished in view of the above-noted circumstances. It is one objective of the present invention to provide a measuring device that can offer a simple way of measuring the roundness of a cylinder.

To achieve this objective of the present invention, the measuring device comprises a base, a holding member mounted to the base and having a notch for holding a cylinder, a first guide rod connected to the base and defining an axial direction parallel to an axial direction of the cylinder, and a gauge mounted with the first guide rod and defining a measuring direction perpendicular to the axial direction of the cylinder.

As described above, the roundness of the cylinder can be measured accurately by moving the gauge without adjusting the position of the cylinder, thereby simplifying the operation of the measuring device of the present invention, and providing a simple way to make the measurement.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Figure 1:
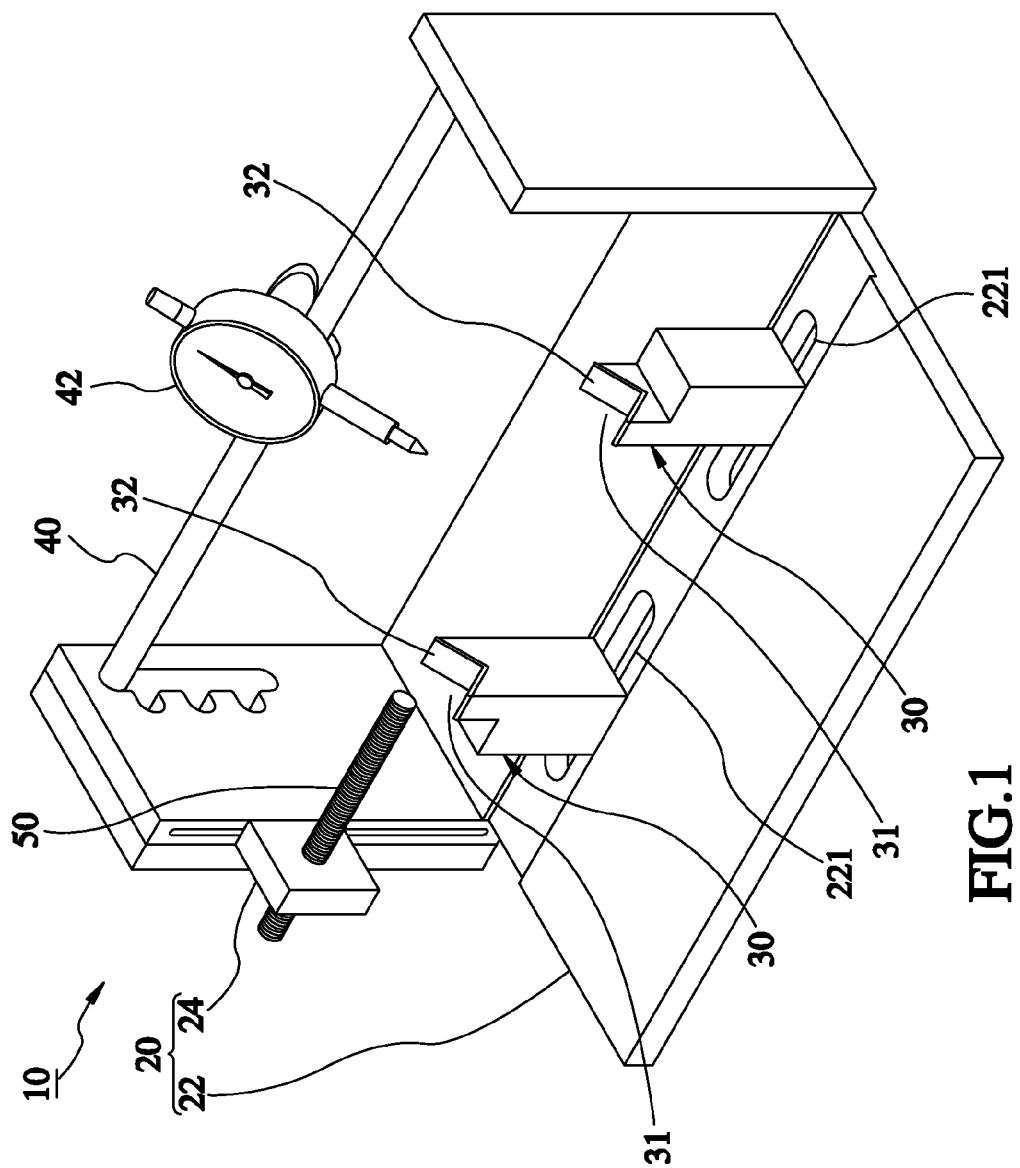
FIG. 1 is a perspective view of a measuring device according to a first preferred embodiment of the prevent invention.
Figure 2:
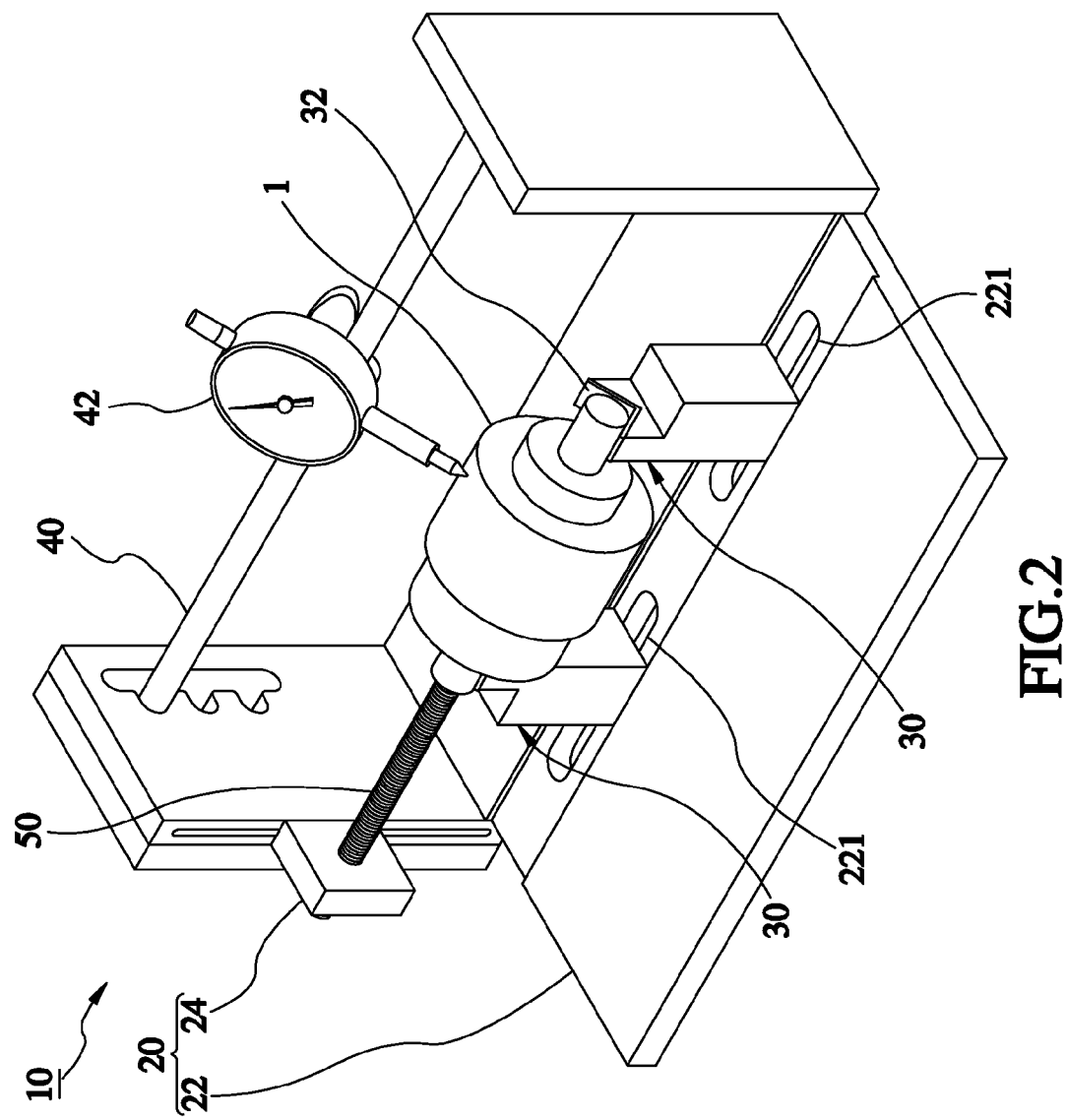
FIG. 2 is a perspective view of the measuring device according to the first preferred embodiment of the prevent invention, showing the measuring device is used.

As shown in FIGS. 1 and 2, a measuring device 10 in accordance with a first preferred embodiment of the present invention comprises a base 20, two holding members 30, a first guide rod 40, a gauge 42, and a locating rod 50.

The base 20 includes a bottom plate 22, two lateral plates 23 connected to two opposite sides of the bottom plate 22, and a movable member 24 movably mounted to one of the lateral plates 23 so as to be movable perpendicularly relative to the base 20.

The holding members 30 are spacedly mounted to the bottom plate 22 of the base 20, and respectively provided at a top end thereof with a V-shaped notch 31 for holding a cylinder 1, thereby changing the relative height of the cylinder 1 and the base 20. The V-shaped notches 31 each have two holding surfaces 32 to be in contact with an outer periphery of the cylinder 1. Probably, the holding member 30 can have an U-shaped notch or a L-shaped notch at the top end to form the holding surfaces; and further, the holding members 30 can be respectively inserted into elongated grooves 221 of the bottom plate 22 of the base 20 to be movable horizontally relative to the base 20.

The first guide rod 40 has two ends respectively inserted into a guide slot 232 of each of the lateral plates 23 of the base 20 to be movable perpendicularly relative to the base 20, and defines an axial direction parallel to the cylinder 1 placed on the V-shaped notches 31 of the holding members 30.

The gauge 42 is slidably mounted to the first guide rod 40 such that the relative height of the gauge 42 and the base 20 is changeable through the perpendicular movement of the first guide rod 40. The gauge 42 defines a measuring direction perpendicular to the axial direction of the cylinder 1.

The locating rod 50 can be a threaded rod or an ejector pin. In this embodiment, the locating rod 50 is the threaded rod, threaded with the movable member 24 to be driven by the movable member 24 to move perpendicularly relative to the base 20, thereby changing the relative height of the locating rod 50 and the base 20, and to be movable horizontally relative to the movable member 24 to push the cylinder 1. The locating rod 50 defines an axial direction coaxial to the axial direction of the cylinder 1.

By means of the aforesaid design, when the cylinder 1 is rotated around its axial direction, as shown in FIG. 2, the holding members 30 can ensure the cylinder 1 a stable rotation through the V-shaped notches 31 such that the roundness of the cylinder 1 can be measured by the gauge 42. Accordingly, a user can make the roundness measurement by moving the gauge 42 without adjusting the position of the cylinder 1, thereby simplifying the operation of the measuring device 10 of the present invention, and providing a simple way to make the measurement.

Figure 3:
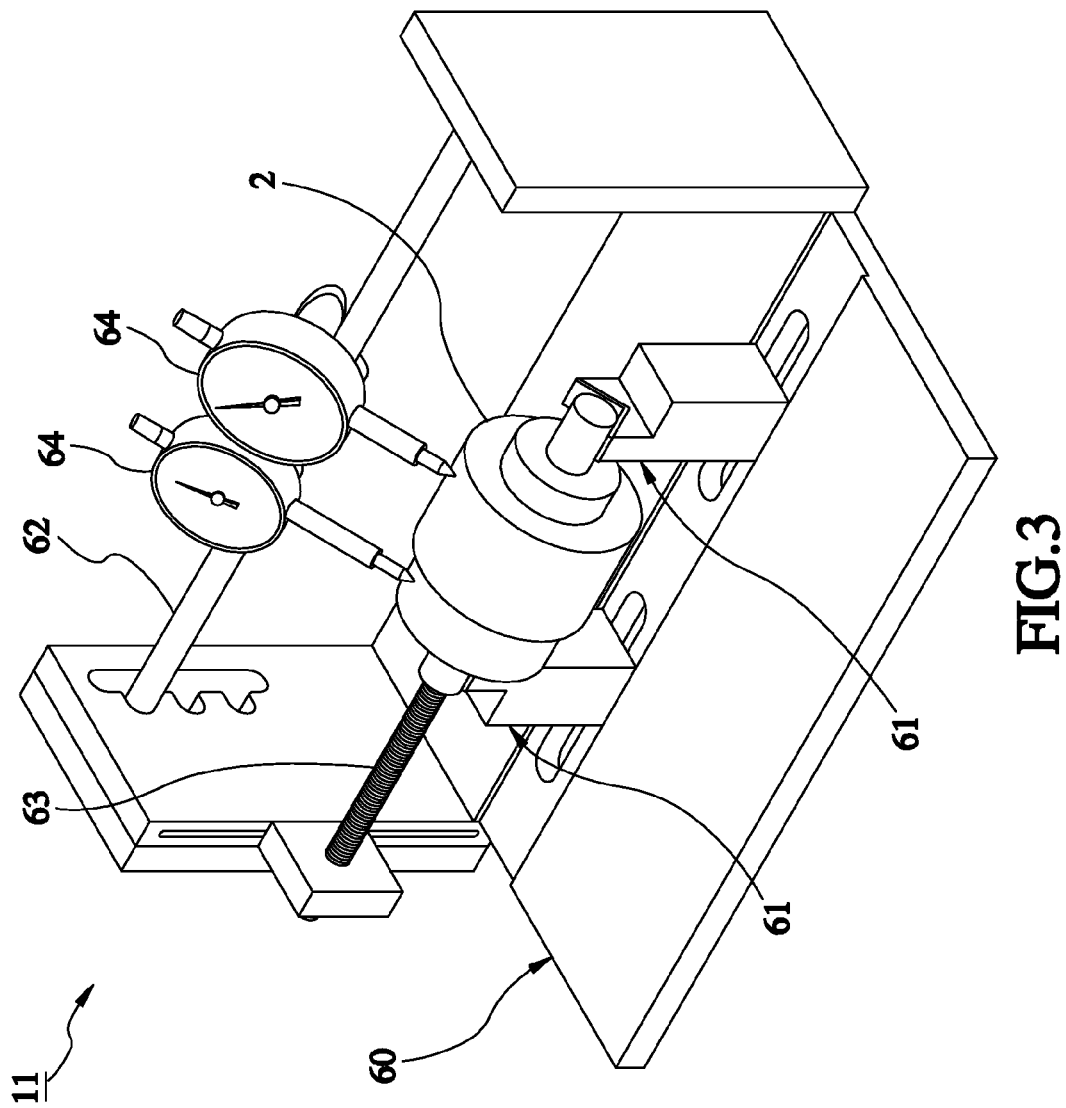
FIG. 3 is a perspective view of the measuring device according to a second preferred embodiment of the prevent invention.

As shown in FIG. 3, a measuring device 11 in accordance with a second preferred embodiment of the present invention comprises a base 60, two holding members 61, a first guide rod 62, a locating rod 63, and two gauges 64.

The gauges 64 can be used to measure the roundness of different parts of the cylinder 2 at the same time.

Figure 4:
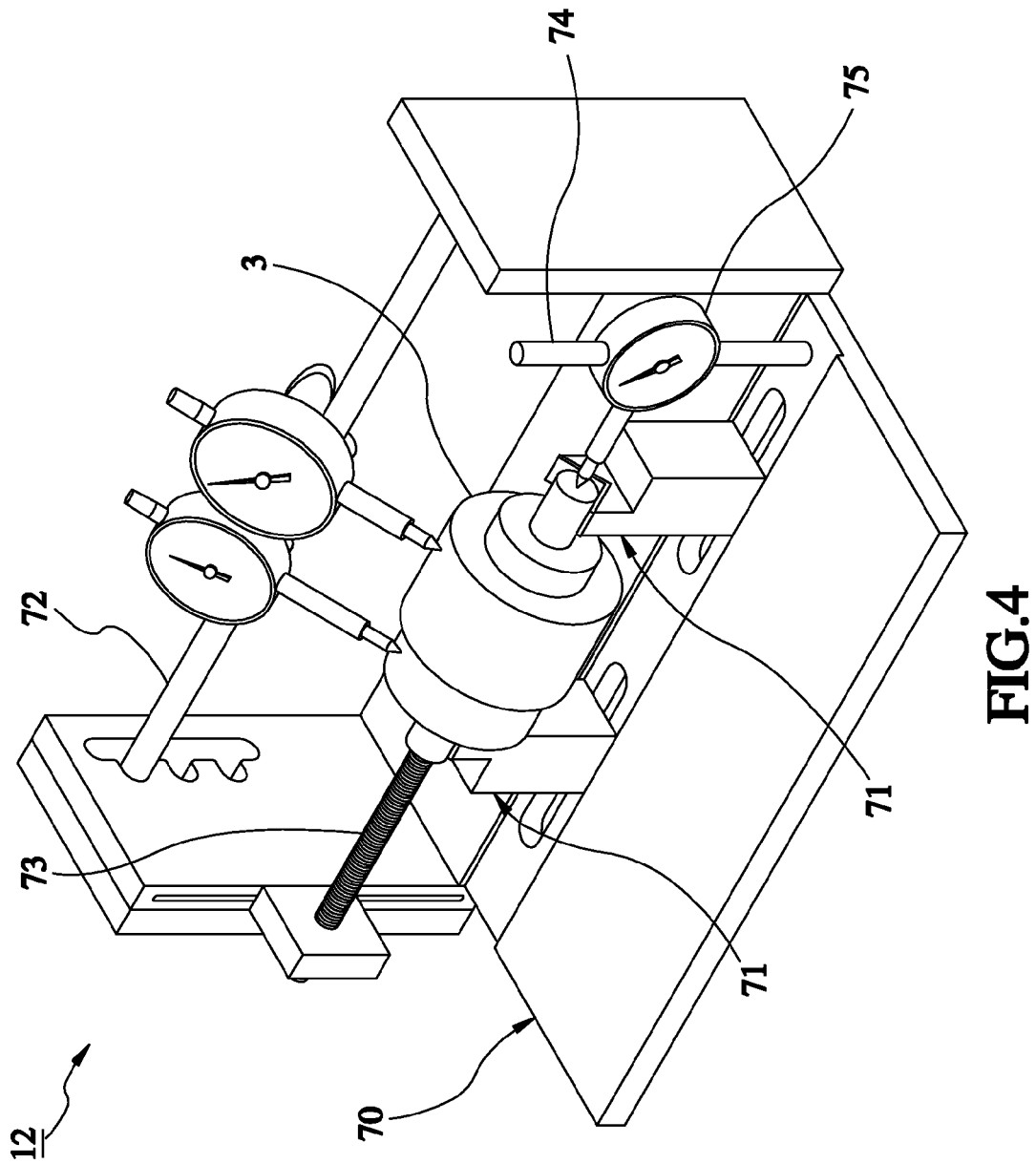
FIG. 4 is a perspective view the measuring device according to a third preferred embodiment of the present invention.

As shown in FIG. 4, a measuring device 12 in accordance with a third preferred embodiment of the present invention comprises a base 70, two holding members 71, a first guide rod 72, a locating rod 73, a second guide rod 74, and a gauge 75.

The second guide rod 74 is mounted to the base 70 and defines an axial direction perpendicular to the axial direction of the cylinder 3.

The gauge 75 is mounted to the second guide rod 74 for measuring the length of the cylinder 3.

When the cylinder 3 is placed between the locating rod 73 and the gauge 75, the length of the cylinder 3 can be measured through the gauge 75 according to the known distance between the locating rod 73 and the gauge 75.

Figure 5:
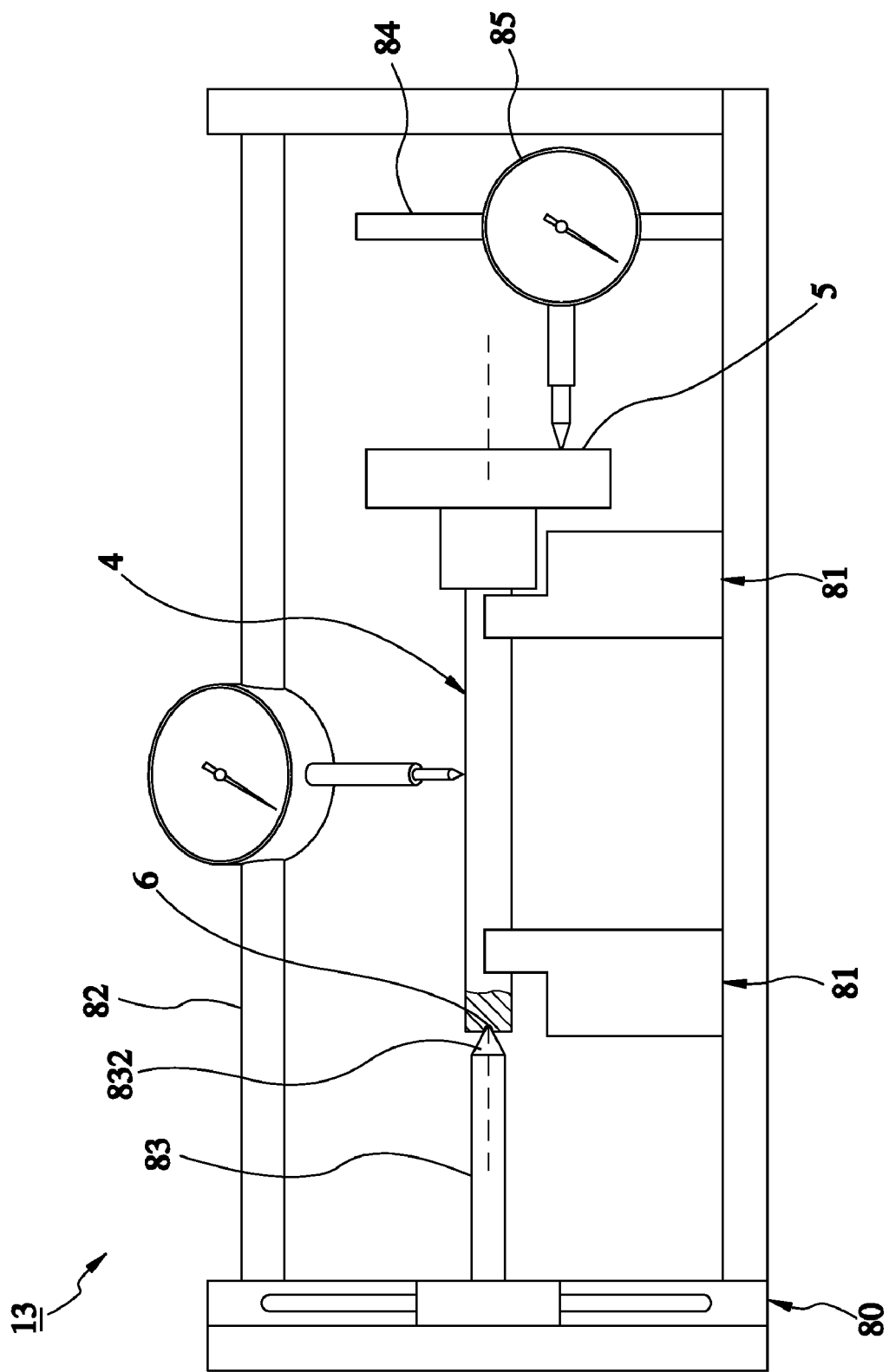
FIG. 5 is a perspective view the measuring device according to a forth preferred embodiment of the present invention.

As shown in FIG. 5, a measuring device 13 in accordance with a forth preferred embodiment of the present invention comprises a base 80, two holding members 81, a first guide rod 82, a locating rod 83, a second guide rod 84, and two gauges 85 and 86.

The locating rod 83 has a tapered end 832 to be abutted against a center hole 6 of a distal end of the cylinder 4.

The second guide rod 84 defines an axial direction perpendicular to the axial direction of the cylinder 4.

The gauge 85 is mounted to the second guide rod 84.

If the center hole 6 of the cylinder 4 is eccentric, the eccentric distance between the center hole 6 and its axis can be measured through the gauge 86; moreover, the gauge 85 can be used to measure whether an end surface 5 of the cylinder 4 is perpendicular to the axial direction of the cylinder 4 or not.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A measuring device comprising:
   a base;
   a holding member mounted to the base and having a notch for holding a cylinder;
   a first guide rod connected to the base and defining an axial direction parallel to an axial direction of the cylinder;
   a gauge mounted with the first guide rod and defining a measuring direction perpendicular to the axial direction of the cylinder; and
   a locating rod movably mounted with the base for pushing the cylinder, and defining an axial direction coaxial to the axial direction of the cylinder.

2. The measuring device as claimed in claim 1, wherein the holding member has a holding surface for touching with an outer periphery of the cylinder.

3. The measuring device as claimed in claim 1, wherein the first guide rod is movably connected to the base and movable perpendicularly relative to the base for changing the relative height of the gauge and the base.

4. The measuring device as claimed in claim 1, wherein the locating rod is a threaded rod.

5. The measuring device as claimed in claim 1, wherein the locating rod passes through a movable member of the base such that the relative height of the locating rod and the base can be is changeable through the movement of the movable member.

6. The measuring device as claimed in claim 1, wherein the locating rod has a tapered end.

7. The measuring device as claimed in claim 1, further comprising a second guide rod connected to the base and having an axial direction defining a predetermined angle with the axial direction of the cylinder, and a gauge mounted with the second guide rod and defining a measuring direction parallel to the axial direction of the cylinder.

8. The measuring device as claimed in claim 1, the holding member is movably mounted to the base.

* * * * *